US006786122B2

(12) United States Patent
Svetlik

(10) Patent No.: US 6,786,122 B2
(45) Date of Patent: Sep. 7, 2004

(54) SCALE SYSTEM FOR USE WITH A MOVABLE TABLE

(75) Inventor: Kenneth N. Svetlik, Schaumburg, IL (US)

(73) Assignee: Credo Technology Corporation, Wilmington, DE (US)

( * ) Notice: Subject to any disclaimer, the term of this patent is extended or adjusted under 35 U.S.C. 154(b) by 0 days.

(21) Appl. No.: 10/669,915

(22) Filed: Sep. 24, 2003

(65) Prior Publication Data

US 2004/0060411 A1 Apr. 1, 2004

Related U.S. Application Data

(63) Continuation of application No. 09/333,746, filed on Jun. 15, 1999, now Pat. No. 6,725,755.

(51) Int. Cl.[7] ................................................. B26D 7/27
(52) U.S. Cl. ...................... 83/468; 83/477.2; 83/522.19
(58) Field of Search ........................... 83/477.2, 522.19, 83/522.18, 468, 468.1; 33/494, 679.1, 640, 809, 810

(56) References Cited

U.S. PATENT DOCUMENTS

| 580,658 A | 4/1897 | Burnham |
|---|---|---|
| 816,424 A | 3/1906 | Bemis |
| 1,649,955 A | 11/1927 | Gardner |
| 1,938,548 A | 12/1933 | Tautz |
| 2,097,920 A | 11/1937 | Hedgpeth |
| 2,166,703 A | 7/1939 | Boice |
| 2,576,340 A | 11/1951 | Hammond |
| 2,641,845 A | 6/1953 | Gundlach |
| 2,744,549 A | 5/1956 | Johnson |
| 2,780,870 A | 2/1957 | Clor |
| 2,806,493 A | 9/1957 | Gaskell |
| 2,808,084 A | 10/1957 | Eschenburg et al. |
| 3,242,780 A | 3/1966 | Ried et al. |
| 3,768,357 A | 10/1973 | McBride |
| 3,935,777 A | 2/1976 | Bassett |
| 4,111,088 A | 9/1978 | Ziegelmeyer |
| 4,170,158 A | 10/1979 | Weaver |
| 4,206,910 A | 6/1980 | Biesemeyer |
| 4,502,518 A | 3/1985 | Lewin |
| 4,521,006 A | 6/1985 | Waters |
| 4,693,158 A | 9/1987 | Price |
| 5,062,339 A | 11/1991 | Campos |
| 5,458,171 A | 10/1995 | Ward |
| 5,577,429 A | 11/1996 | Noble |
| 5,647,258 A * | 7/1997 | Brazell et al. ................ 83/468 |
| 5,722,308 A | 3/1998 | Ceroll et al. |
| 5,758,558 A | 6/1998 | Squires |
| 5,927,857 A | 7/1999 | Ceroll et al. |
| 6,148,703 A | 11/2000 | Ceroll et al. |
| 6,360,641 B1 | 3/2002 | Talesky et al. |

OTHER PUBLICATIONS

Toolkraft Corporation, "Toolkraft Radial Arm Saw," Operating Instructions and Parts List, No. 910A12–265 Instruction Manual, pp. 1–24, Toolkraft Corporation, 700 Plainfield Street, Springfield, Massachusetts (1964).

* cited by examiner

Primary Examiner—Stephen Choi
(74) Attorney, Agent, or Firm—Gardner Carton & Douglas LLP

(57) ABSTRACT

A scale system used with a table saw. The table saw has a stationary table, a movable table and support rails portion relative the stationary table, and a rip fence that slides over the stationary table and the movable table. The scale system includes a first measurement scale and a second measurement scale located relative the stationary table. The first measurement scale includes a zero marking aligned with a point on the stationary table and a last marking separated from the zero marking. The initial marking on the second scale is aligned proximate the last marking such that the second scales runs counter to the first scale. A pointer system designates the distance on the measurement scales the unit is from the point where a first pointer on the unit measures on the first measurement scale and a second pointer on the stationary table measures on the second scale. The scale system can include a third measurement scale on the opposite side of the scale.

21 Claims, 4 Drawing Sheets

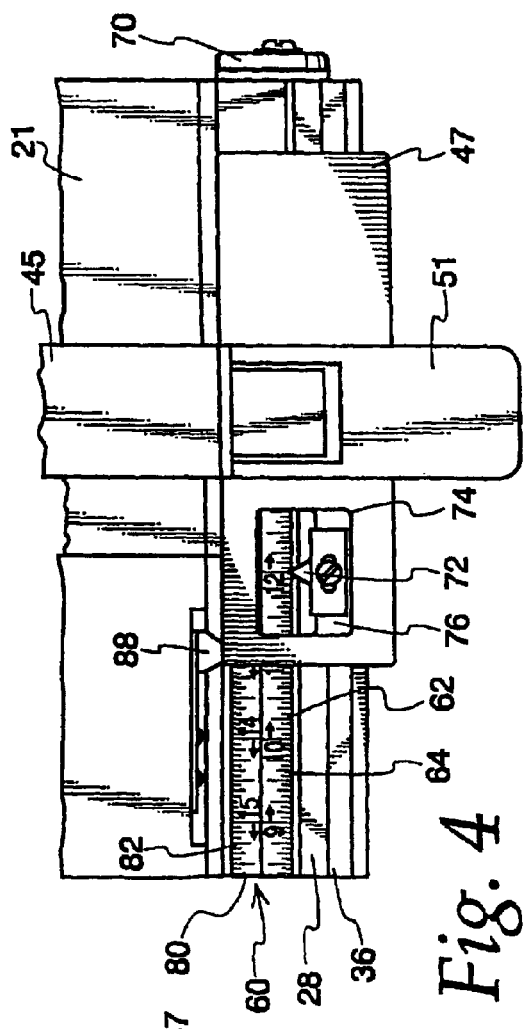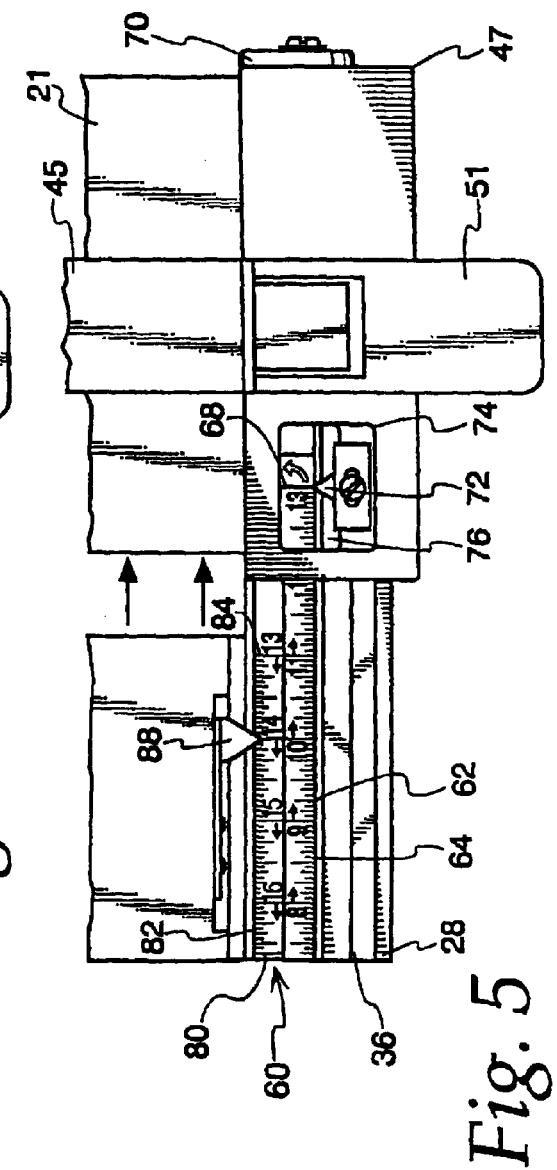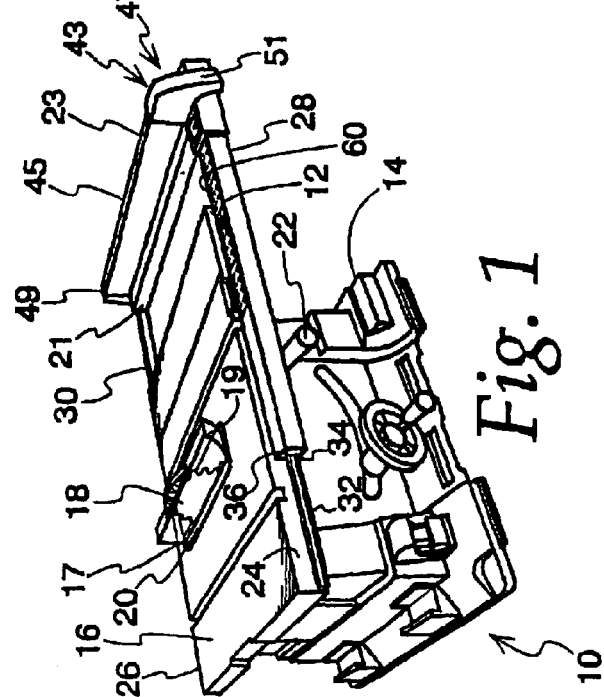

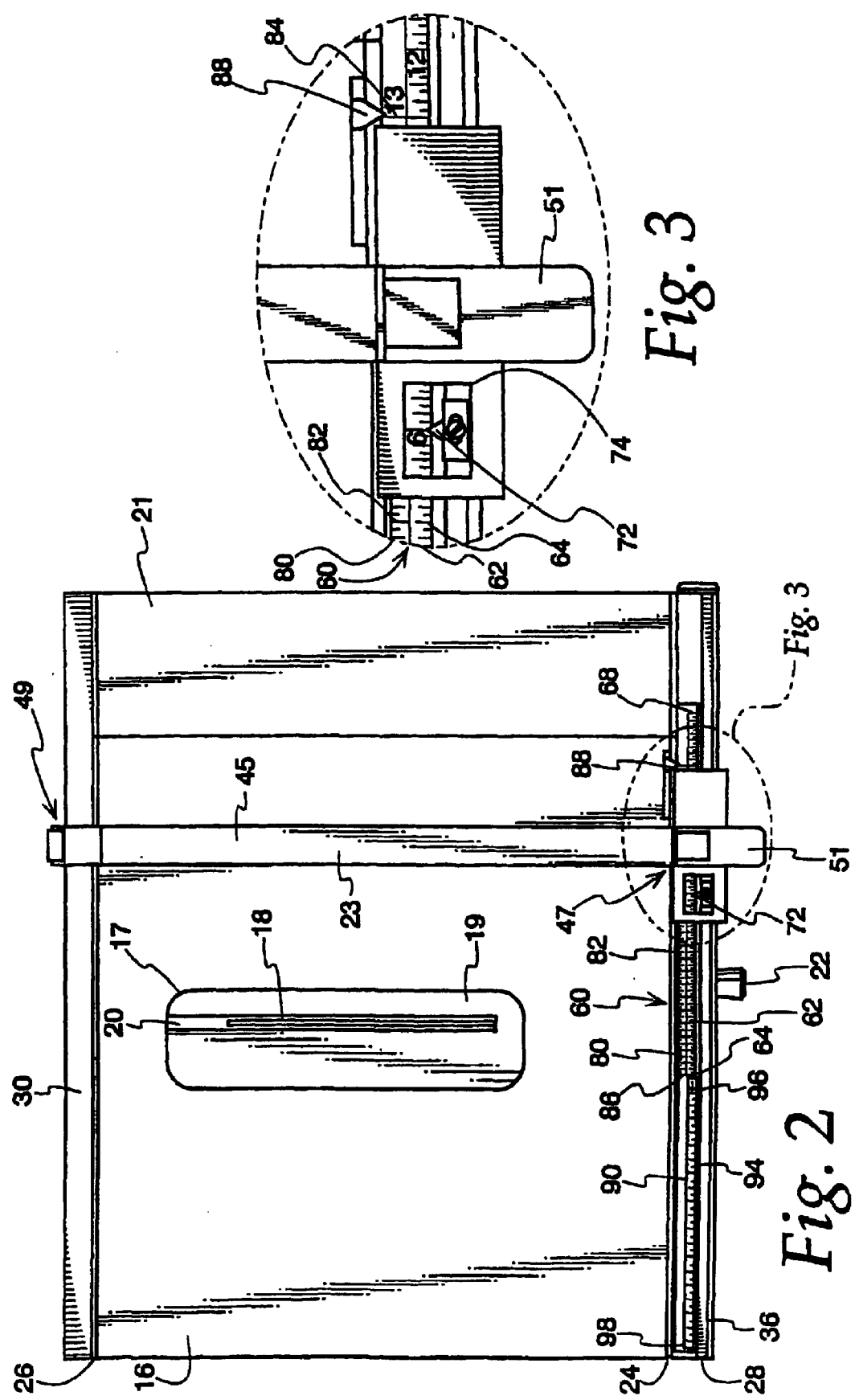

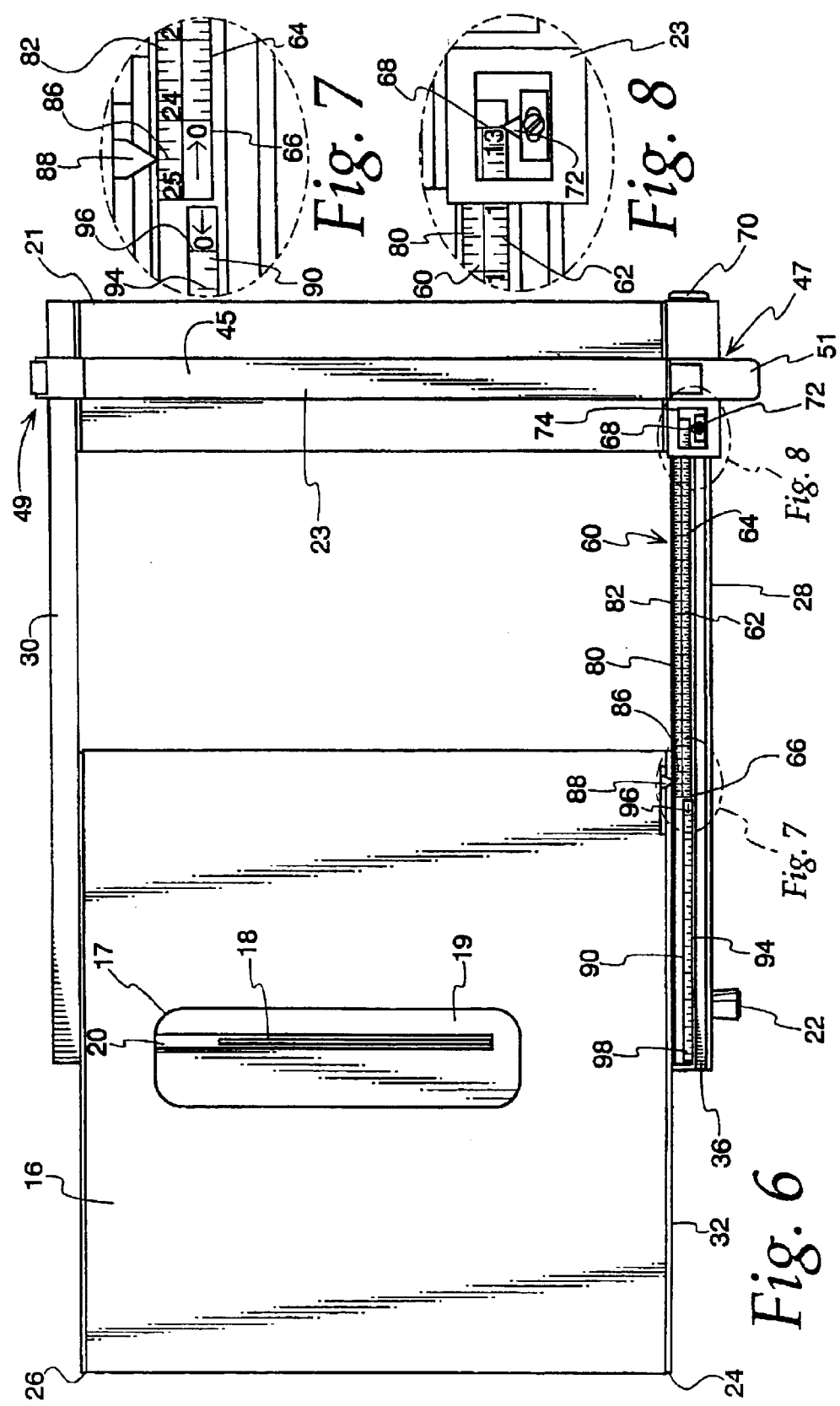

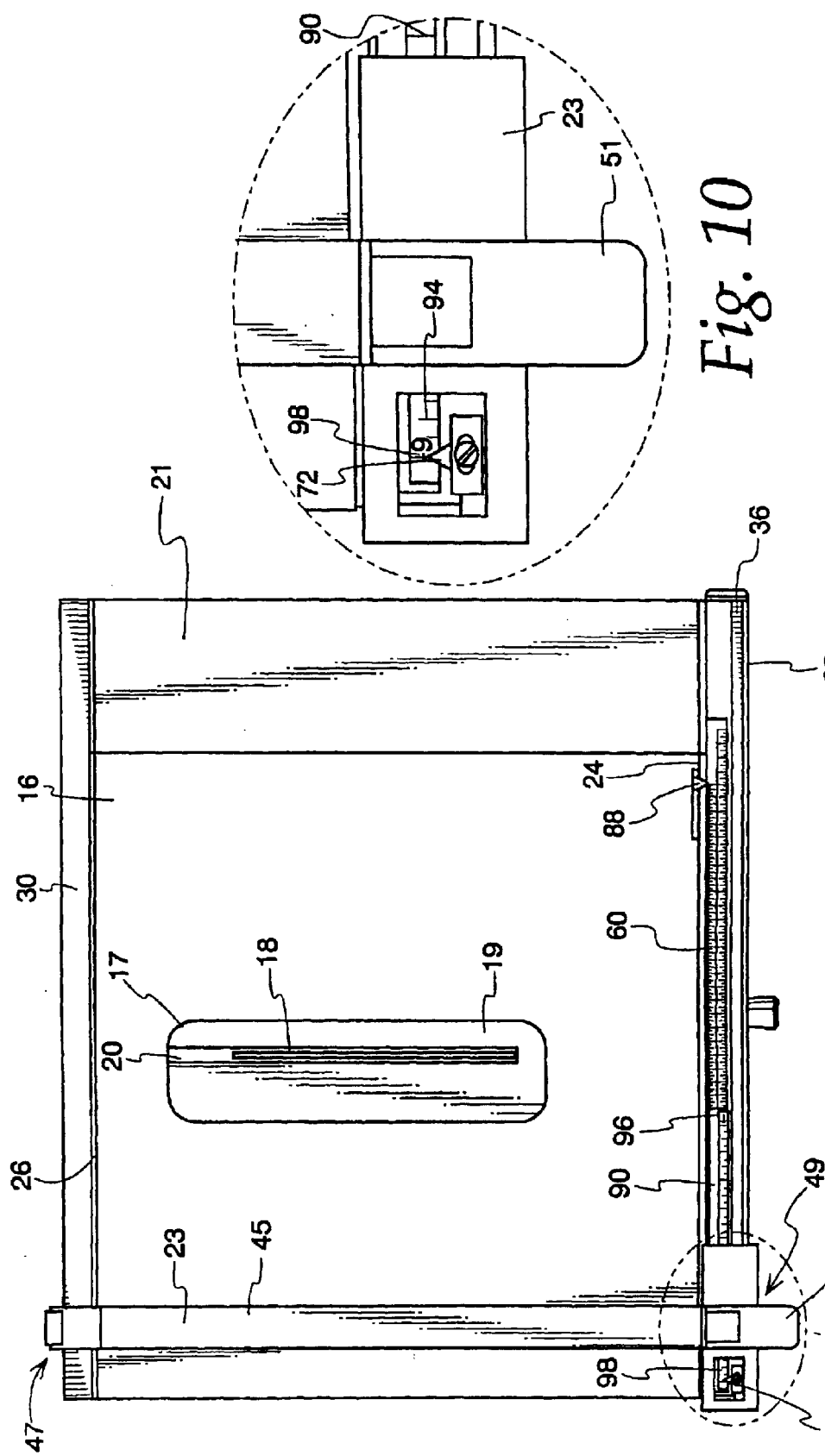

SCALE SYSTEM FOR USE WITH A MOVABLE TABLE

CROSS-REFERENCE TO RELATED PATENT APPLICATIONS

This patent application is a continuation of U.S. patent application Ser. No. 09/333,746, filed Jun. 15, 1999, now U.S. Pat. No. 6,725,755.

BACKGROUND OF THE INVENTION

The present invention relates to a scale system for use with a movable table and, in particular, to measure the position of a rip fence on a table saw having a movable auxiliary table portion.

Tables that are used for various purposes are often provided with an auxiliary table that moves relative the stationary main table. In certain applications, scale systems are used to position the movable table a specific distance from a point designated on the stationary table. In addition, separate units can be used with the table where the unit is movable relative the table. Similarly, scale systems are used to position the movable unit at a specific position relative the designated point.

Table saws that have a movable rip fence often use a scale system to position a movable auxiliary table or rip fence. Table saws of various designs include a base and an upper cutting surface having an opening through which a blade extends. The upper surface supports a material, such as wood, as it is pushed toward the blade for cutting. Table saws have traditionally been stand-alone pieces of equipment that are used in workshops. Because most stand-alone table saws are used in large open spaces, the dimensions of the table saw can be large enough to support materials of various sizes for cutting.

Tables saws that are used in workshops are not readily moved from one location to another. At construction sites, it is useful to have a table saw that can be easily moved from one location to another or between different construction sites. Accordingly, smaller and portable table saws have been designed. These table saws use lighter materials and have reduced the dimensions of the base and the upper surface to reduce the size and weight of the table saw thereby creating the desired portable table saw. Portable table saws can be designed with movable auxiliary table sections to increase the working space of the table saw while maintaining a saw that is portable. The portable table saws also use a separable folding table, or saw stand, to hold the table saw at the correct height for operation.

An integral part of most table saws is a movable rip fence. The rip fence is positioned perpendicular to the upper cutting surface and is aligned generally parallel to the position of the blade. Most rip fences are designed to span between the front edge and the rear edge of the upper cutting surface. Moreover, the rip fence can be positioned in any position along the upper surface and is secured in such a position by a locking mechanism. The rip fence is usually secured in a position a given distance away from the blade and can be put on either side of the blade. For table saws that include auxiliary tables, the rip fence can slide over the entire span of the table. When the rip fence is secured in a position, the material can be pushed against the side of the rip fence and along the upper surface while it is being cut by the blade. Thus, accurate and straight cuts can be made.

Table saws have long used different types of scale systems to determine the location of the rip fence relative the blade. The general purpose of those scale systems is for the user to know the size of the piece of wood being cut. For example, if the cut piece of wood is to be 10 inches, the user uses the scale system to position the rip fence 10 inches from the blade. The rip fence is secured in that position by the rip fence's locking mechanism. The side of the wood is pushed against the rip fence, and the user slides the wood across the upper cutting surface and along the rip fence to make a parallel cut by the blade.

The most common scale system used for cutting wood has a measurement scale placed on the front fence support rail attached to the upper surface of the table saw. The measurement scale can extend in two directions so that the position of the rip fence can be placed on either the right or left side of the blade. The rip fence is provided with a pointer to measure the distance from the blade on the measurement scale. The zero marking of the measurement scale is placed on the front fence support rail where the pointer is positioned when the rip fence is immediately adjacent the blade. The zero marking is therefore aligned relative the blade but not necessarily in the position on the scale aligned with the blade. The last marking on each side of the blade is placed so that the pointer on the rip fence can read the distance from the blade when the rip fence is in its furthest, supported position.

Most rip fences are designed to slide on rails attached to the front and rear edges of the table saw. Accordingly, the scale system can be positioned on those rails. For those embodiments, the pointer is placed in a viewing window on the rip fence. Alternatively, the scale system can be provided directly on the upper cutting surface. For that embodiment, the rip fence includes a pointer that extends from the rip fence to the scale on the upper cutting surface. The risk is that the pointer may be inadvertently adjusted thereby offsetting the calibration of the scale system.

Other rip fences are provided with dual use scale systems. These scale systems use at least two coinciding measurement scales where one measurement scale runs parallel to the second measurement scale. Dual scale systems are used for table saws where rip fences can be move on different rails for short or wide cuts. They can also be used for table saws where the cutting blade can be positioned at different locations on the upper cutting surface or when the table saw has a circular saw component and a router component. Other saws include a first measurement scale on one location of the saw and a second measurement scale at a different location of the scale. The first measurement scale can be used to position the rip fence and the blade and the second measurement scale can be used to measure the size of the wood.

Dual scale systems are also used with table saws where the rip fence can move into an extended position. For this type of table saw, the same measurement scale is used where each indication marking has multiple corresponding numbers. One set of numbers is used when the rip fence slides in the normal position. The second measurement scale of numbers is used when the rip fence is in the extended position. The distance of offsetting the numbers exactly corresponds to the distance between the rip fence in the normal position and the extended position. Accordingly, the same indication markings can be used.

SUMMARY OF THE INVENTION

In view of the foregoing, it is an object of the present invention to have a scale system for use with a table saw that simply determines the position of a movable rip fence relative the blade. It is also an object of the present invention to provide a scale system for a table saw that has a movable auxiliary table where the rip fence moves relative the stationary table and with the auxiliary table. To operate with the auxiliary table, the scale system requires multiple indication markings for use with the stationary table and the auxiliary table. It is also an object of the present invention to include multiple pointers that operates with the multiple measurement scales. In addition, the scale system can include a third measurement scale so that the rip fence can be used on two sides of the blade.

The present invention relates to a table saw that includes a scale system to determine the location of a rip fence that is slidable relative to the table saw. The table saw used with the scale system includes a base portion and upper cutting surface. A blade extends through an opening in the upper surface to cut wood or other material. The upper surface is used to support the material as it is pushed on the table saw and cut by the blade. Front and rear edge surfaces extend perpendicularly from the front and rear edges of the upper surface. A rip fence is also provided that slides along the upper cutting surface and can be locked in any position so that it is parallel to the blade.

The rip fence of the present invention can be used with a table saw that has a movable auxiliary table. The auxiliary table can move between a first position adjacent the upper surface and a second position separated from the upper surface according to any of the many known methods. In the present invention, the auxiliary table is connected to rails that slide on brackets attached to the front and rear edge surfaces of the upper cutting surface.

The rip fence moves between positions relative the upper surface and auxiliary table and can be locked in any position such that the rip fence is parallel to the blade. This arrangement ensures that accurate cuts are made of material. The rip fence slides within a slot formed in the front rail so that the rip fence moves relative the upper surface. The front rail is movably attached to the upper cutting surface.

The rip fence includes a locking mechanism to secure the rip fence in a position along the rails attached to the upper cutting surface or the auxiliary table surface. In the locked position, wood can be pressed against the locked rip fence and cut by the blade as the wood is pushed across the upper cutting surface. In the released position, the rip fence can slide between a position adjacent the blade and an extended position at the ends of the table. When a desired position is located, the rip fence is put in the locked position to secure it for operation of the saw.

The scale system of the present invention is used to position the rip fence on the upper cutting surface or the auxiliary table a given distance from the blade. The given distance is the desired width or length of the wood being cut. The scale system is designed so that the rip fence can be positioned on either side of the blade and the desired measured distance from the blade can be found. On the side of the table saw corresponding to the auxiliary table, the present invention includes dual scale having a first and second measurement scales of indication markings. The scale system is positioned proximate the front edge of the stationary table. The scale system can also be located on the rails on which the auxiliary table slide and be movable with the rails.

The first measurement scale of indication markings is used when the auxiliary table is in the first position adjacent the stationary table and when the fence slides along the stationary and auxiliary tables. The zero marking of the first measurement scale of indication markings corresponds to the rip fence being adjacent the blade, or a zero distance, from the blade. The first measurement scale of indication markings extends to a last marking where the rip fence is in an extended position over the auxiliary table. A second measurement scale of indication markings is used when the rip fence is in the extended position on the auxiliary table and the auxiliary table moves between the first position adjacent the stationary table and the second position separated from the stationary table. The initial marking of the second measurement scale of indication markings has the same measurement as the last marking on the first measurement scale of indication markings. The measurement scale of the second measurement scale of indication markings increase in a counter, or opposing, direction to the markings of the first measurement scale. The final marking of the second measurement scale of indication markings indicates the distance from the blade when the rip fence is in the extended position over the auxiliary table and the auxiliary table is in the second position fully separated from the stationary table. In the preferred embodiment, a third set of indication markings is positioned proximate the dual scale system, but on the opposing side of the blade. The zero marking of the third set is located where the rip fence is immediately adjacent the left side of the blade. The third set is used when the rip fence slides to the left of the blade.

The scale system of the present invention includes two separate pointers to read the first, second and third measurement scales. The first pointer is placed on the rip fence. Accordingly, the first pointer is used to read the measurement markings on the first and third measurement scale as the rip fence slides along the rails movably attached to the stationary table. The second pointer is placed on the upper cutting surface of the stationary table. The second pointer is used to read the measurement markings on the second measurement scale when the rip fence moves with the rails attached to the auxiliary table as the auxiliary table and rails move between the first and second positions.

These and numerous other features and advantages of the present invention will become readily apparent from the following description, the accompanying drawings and the appended claims.

BRIEF DESCRIPTION OF THE DRAWINGS

FIG. 1 illustrates a table saw having a scale system made in accordance with the principles of the present invention;

FIG. 2 illustrates a top view of the table saw having the scale system of the present invention where the rip fence is in a position over the stationary table when the auxiliary table is in the first position;

FIG. 3 is an enlarged view of the scale system shown in FIG. 2;

FIG. 4 is a top view of the scale system when the rip fence is over the auxiliary table while using the first measurement scale of indication markings;

FIG. 5 is a top view of the scale system when the rip fence is in the extended position over the auxiliary table and the auxiliary table is separated from the stationary table thereby using the second pointer;

FIG. 6 is a top view of the present invention where the auxiliary table is in the second position;

FIG. 7 is a top view of the scale system showing the use of the second pointer in FIG. 6;

FIG. 8 is a top view of the scale system showing the use of the first pointer in FIG. 6;

FIG. 9 is a top view of the present invention where the rip fence is on the opposing side of the blade and using the third measurement scale, and FIG. 10 is a top view of the scale system showing the use of the first pointer in FIG. 9.

DETAILED DESCRIPTION OF THE PREFERRED EMBODIMENTS

FIG. 1 illustrates a table saw 10 having a scale system 12 made in accordance with the principles of the present invention. The table saw can be of any known type such as a stand-alone table saw or a portable table saw. The table saw 10 shown in FIG. 1 is designed as a professional-use portable table saw that is durable and can also be moved from site to site. The table saw 10 includes a base 14 and an upper cutting surface 16. The upper cutting surface 16 includes an opening 17 through which the blade 18 extends. A plate 19 having a slot 20 for the blade 18 can be placed in the opening 17. The blade 18 is used to cut a material, such as wood, that is pushed along the upper cutting surface 16.

In the preferred embodiment, as seen in FIG. 1, the table saw 10 includes an auxiliary table 21 that is movable between a first position adjacent the upper cutting surface and a second position separated from the upper cutting surface 16. The auxiliary table 21, as seen in FIG. 1, is shown in the second and separated position. The auxiliary table can be secured in any position between the first and second position by a locking system that is controlled by the lever 22. The table saw also includes a movable rip fence 23.

The upper cutting surface 16 includes a front surface 24 and a rear surface 26. The auxiliary table 21 of the preferred embodiment has a front rail 28, which is attached to the front edge surface of the auxiliary table, and a rear rail 30, which is attached to the rear edge surface of the auxiliary table. The rails 28, 30 slide along brackets 32 that are attached to the front and rear surfaces 24, 26, respectively, of the upper cutting surface. As seen in FIG. 1, the rails 28, 30 include a channel 34 through which the brackets slide. In the preferred embodiment, the front rail 28 includes a slot 36 that extends longitudinally along the upper surface of the front rail 28. In an alternative embodiment of the present invention, the slot 36 can be arranged on the upper cutting surface 16, the outer edge surface of the rail 28, or the front edge surface 24.

The rip fence 23 is configured to slide along the upper cutting surface 16 and, with the auxiliary table 21. In the preferred embodiment, the rip fence has a portion that slides through the slot 36 on the front rail 28 and along the rear rail 30. A surface perpendicular to the upper surface 16 is provided on the rip fence 23 to assist in the cutting of wood. Once the rip fence is properly positioned, the wood can slide against the perpendicular surface and across the upper cutting surface to make the desired cut. The rip fence is positioned a distance from the blade equal to the width or length of the desired wood after cutting.

A rip fence used by the present invention can be of any type known in the art and 23 can move on either side of the blade 18. The rip fence 23 includes a main casing 45, a front clamping portion 47 and a rear clamping portion 49. A locking mechanism (not shown) permits the rip fence 23 to be in either a locked position, in which the rip fence is aligned generally parallel with the blade, or a released position, in which the rip fence 23 can slide along the upper cutting surface 16 or the cutting surface of auxiliary table 21. The main casing 45 has a generally rectangular tube form where two outer surfaces are perpendicular to the upper cutting surface 16. The front clamping portion 47, which controls the locking mechanism, is attached to the front end of the main casing 45. The front clamping portion 47 includes a handle 51 that pivots between a locked lower position and a released upper position. The rear clamping portion 49 is attached to the rear end of the main casing 45. The front clamping portion 47 is linked to the rear clamping portion 49 and sequentially clamps against the front and rear rails 28, 30 when handle 51 pivots to the locked position.

The scale system 12 of the present invention includes at least a dual scale 60 for use when the rip fence 23 is on the side of the blade 18 on which the auxiliary table 21 is positioned. In the preferred embodiment, the scale system 12 and the dual scale 60 is positioned on the rail 28. Accordingly, the scale system 62 moves with the auxiliary table to measure the distance of the rip fence from the blade 18. As seen in FIG. 2, the dual scale 60 is used when the rip fence 23 is to the right of the blade 20.

The dual scale 60 includes a first measurement scale 62 including multiple indication markings 64. The indication markings 64 begin with a zero marking 66 and extend to a last marking 68. The zero marking 66 indicates when the rip fence is immediately adjacent to or a zero distance from blade 18. As seen in the Figures, the zero marking 66 can be offset from the point on the rail 28 aligned with blade 18. The last marking 68 for the measurement scale 62 indicates the distance from the blade when the rip fence 23 is in an extended position. The rip fence 23 is an extended position when it is over the auxiliary table 21 and against a stop plate 70 at the end of the front rail 28.

The measurement scale 62 is calibrated to any scale such as the English or metric system. The indication markings 64 are marked and positioned on the front rail 28 such that they show the exact measurement of the adjacent edge of the circular saw blade to the interface of the rip fence 23 when aligned with the indication markings 64. The indication markings 64 are, in fact, positioned to read the distance of the rip fence 23 from a given position on a saw blade width and to achieve greater accuracy the fence may be set to a zero position and the saw blade positioned directly against the rip fence 23. In this manner, the rip fence 23 may be quickly and accurately positioned to give the desired width of a cut.

The first measurement scale of indication markings is read by a first pointer 72 that is located on the rip fence 23. In the preferred embodiment, the first pointer 72 is located in a viewing window 74. The viewing window 74 can include a magnifying glass component (not shown) to assist in the reading of the indication markings 64. In addition, calibration markings can be incorporated into the viewing window to aid in the positioning of the pointer at the correct position on the measurement scale 62. As seen in FIG. 3, the size of the viewing window is such that the first pointer 72 indicates the location of the rip fence 23 only on the first measurement scale 62 of indication markings 64 and does not indicate the position on any other markings of the dual scale 60.

The dual scale system 60 also includes a second measurement scale 80 of indication markings 82. The second measurement scale 80 is used for when the rip fence is positioned in the extended position over the auxiliary table 21 and the auxiliary table moves between the first position and the second position. The initial marking 84 of the second measurement scale 80 indicates that the rip fence is the same distance from the blade as the last marking 68 on the measurement scale 62. As seen in the Figures, the initial marking 84 and the last marking 68 do not necessarily align together on the dual scale 60. The final marking on the second measurement scale 80 indicates when the rip fence 23 is in the extended position and the auxiliary table is in the second position. The indication markings 82 between the initial marking 84 and the final marking 86 run in a counter direction to the indication markings 64 between the zero marking 66 and the last marking 68. Like the first measurement scale 62, the second measurement scale 80 uses the English or metric system.

The second measurement scale 80 of indication markings 82 are read by a second pointer 88 which is positioned on the upper cutting surface 16 of the table saw 10. Accordingly, the pointer 88 is stationary, while the dual scale 60, and the second measurement scale 80 moves with the auxiliary table 21, rail 28, and rip fence 23. The second pointer 88 is positioned on the upper cutting surface 16 so that it appropriately reads the second measurement scale 80 of indication markings 82. The position of the second pointer dictates the offset distance between the last markings 68 and the initial marking 84. As seen in the Figures, the second pointer 88 is positioned proximate the end of the upper cutting surface 16 thereby reducing the offset and providing sufficient space on the dual scale 60 to measure the distance of the auxiliary table is from the stationary table of the upper cutting surface. The second pointer 88 can be configured with a magnifying portion (not shown) to increase the visibility of the pointer and the second measurement scale 80 of indication markings 82.

Referring to FIGS. 4–5, the rip fence uses the first pointer when the auxiliary table is in the first position. Because of the size of the viewing window 74 and the location of the second pointer 88, it is difficult to read the second measurement scale 80 of indication markings 82 when the auxiliary table 21 is in the first position. When the rip fence 23 is in the extended position and the auxiliary table 21 is separated from the upper cutting surface 16, the second pointer 88 is readily seen and indicates the position of the rip fence 23 by using the second measurement scale 80 of indication markings 82.

Referring to FIGS. 6–8, the rip fence 23 is shown in the extended position when the auxiliary table 21 is in a second position away from the stationary table. The second pointer 88 indicates that the rip fence is in the final position by pointing to the final marking 86. The first pointer 72 indicates that the rip fence is in the extended position on the measurement scale 62 of indication markings 64.

In the preferred embodiment, a third measurement scale 90 of indication markings 94 is provided to the left of the dual scale 60. The third set 90 is used when the rip fence 23 is to the left of the blade 20. The first marking 96 of the third measurement scale 90 of indication markings 94 indicates when the rip fence 23 is immediately adjacent, to or is a zero distance from, the blade's left side. The end marking 98 indicates when the rip fence 23 is at the end of the front rail 28. The first pointer 72 is used to read the third set 90 of indication markings 94.

As mentioned, the scale system 12 of the present invention is used for a portable table saw 10. Because of the size constraints of the table saw 10, the total width of the table saw is 29 inches and the length of the front rail 28 right of the saw blade is approximately 17 inches long. Accordingly, the measurement scale 62 extends between the zero marking 66 of zero inches to a last marking 68 of 13 inches. For most professional uses, a user needs to be able to extend the rip fence 23 at least 24 inches to one side of the blade 20 so that a 4×8 foot sheet of wood material can be rip cut across its width in order to create half-sheets. The second measurement scale 80 begins with an initial marking of 13 inches and extends to at least a final marking of 24½ inches. As seen in the drawings, the second measurement scale 80 of indication markings 82 can increase to the 24½ inches setting. The third set 90 of indication markings extend from a first marking 96 of zero to an end marking 98 of approximately 9 inches left of the saw blade. In the preferred embodiment, the third set 90 of markings extends 8$^{13}$⁄$_{16}$ inches to the left of the blade.

When operating the table saw 10 and the auxiliary table 21 is in the first position, the user slides the rip fence 23 on the rails to the left or right of the blade. The first pointer 72 is used to read the first or third set measurement scale 62, 90 depending on which side of the blade 18 the rip fence 23 is positioned. When the handle 51 is in the released position, the rip fence 23 slides along the front and rear rails 28, 30, and just above the upper cutting surface 16 from a position adjacent the blade to an extended position fully away from the blade. When the desired location is found using the first pointer 72, the handle 51 is put into the locked position to lock the rip fence 23 in that position. The user then goes through the cutting operations.

If a cut more than 13 inches is required, the user can move the auxiliary table 21 away from the upper cutting surface 16 to provide a cutting capacity up to 24½ inches. The rip fence 23 is placed in the extended position against the stop plate 70. The operator then moves the lever 22 to release the locking system for the auxiliary table 21. The front and rear rails 28, 30 slides along the brackets 32 to a desired position. The operator reads the scales using the second pointer 88 to read the second measurement scale 80. When the desired position on the second measurement scale 80, the lever 22 moves to lock the locking system to secure the auxiliary table in that position. The user then performs the cutting operations.

Although the present invention has been described in considerable detail with reference to certain preferred versions, other versions are possible. Therefore, the spirit and scope of the appended claims should not be limited to the description of the preferred embodiment described.

What is claimed is:

1. A table saw comprising:
    a stationary table including an upper surface, an opening disposed through the stationary table through which a blade extends;
    an auxiliary table linearly movable relative to the stationary table to any position between a non-extended position adjacent the stationary table and an extended position, the auxiliary table including an auxiliary surface aligned generally coplanar with the stationary table;
    a rip fence movable relative to the stationary table and auxiliary table, the rip fence being lockable relative to the auxiliary table at a predetermined extended position; and
    a scale system including:
        a first pointer fixed to the rip fence;
        a first scale readable by the first pointer to indicate a distance of the rip fence relative to the blade when the auxiliary table is in the non-extended position;
        a second pointer fixed to the stationary table; and
        a second scale readable by the second pointer to indicate a distance of the rip fence relative to the blade when the auxiliary table is in the extended position and when the rip fence is locked in said predetermined extended position relative to the auxiliary table; and
    a stop operable to stop movement of the rip fence relative to the auxiliary table at the predetermined position as the rip fence is moved away from the blade.

2. The table saw of claim 1, wherein the first scale is fixed to the auxiliary table.

3. The table saw of claim 1, wherein the second scale is fixed to the auxiliary table.

4. The table saw of claim 1, wherein each of the first and second scales is aligned generally parallel to a direction along which the auxiliary table is movable.

5. The table saw of claim 1, wherein the first scale has a zero marking positioned such that the first pointer indicates the zero marking when the rip fence is adjacent the blade and a last marking positioned such that the first pointer indicates the last marking when the rip fence is in the predetermined extended position relative to the auxiliary table.

6. The table saw of claim 5, wherein the second scale has an initial auxiliary marking positioned such that the second pointer indicates the initial auxiliary marking when the auxiliary table is in the non-extended position.

7. The table saw of claim 6, wherein the second scale has a final auxiliary marking positioned such that the second pointer indicates the final auxiliary marking when the auxiliary table is in the extended position.

8. The table saw of claim 7, wherein increments of the first scale increase from the zero marking to the last marking along a first direction, and wherein increments of the second scale increase from the initial auxiliary marking to the final auxiliary marking increase along a second direction opposite to the first direction.

9. The table saw of claim 1, wherein the stop includes a stop plate projecting from an outer side of the auxiliary table to abut the rip fence.

10. The table saw according to claim 1 further comprising a locking system to lock the auxiliary table in a selected position relative to the stationary table.

11. The table saw according to claim 1 wherein the fence includes a locking mechanism to secure fence in a position relative to the auxiliary table.

12. A table saw comprising:
   a stationary table including an upper surface, an opening disposed through the stationary table through which a blade extends;
   at least one bracket fixed to the stationary table;
   at least one rail member slidably mounted to the bracket for linear movement relative to the stationary table;
   an auxiliary table fixed to the movable rail, the auxiliary table being linearly movable relative to the stationary table to any position between a non-extended position adjacent the stationary table and an extended position, the auxiliary table including an auxiliary surface aligned generally coplanar with the stationary table;
   a rip fence movable relative to the stationary table and auxiliary table, the rip fence being lockable relative to the auxiliary table at a predetermined extended position; and
   a scale system including:
      a first pointer fixed to the rip fence;
      a first scale indicating measurements readable by the first pointer to indicate a distance of the rip fence relative to the blade when the auxiliary table is in the non-extended position;
      a second pointer fixed to the stationary table; and
      a second scale indicating measurements readable by the second pointer to indicate a distance of the rip fence relative to the blade when the auxiliary table is in the extended position and when the rip fence is locked in said predetermined extended position relative to the auxiliary table.

13. The table saw of claim 12, wherein the first scale is fixed to the rail.

14. The table saw of claim 12, wherein the second scale is fixed to the rail.

15. The table saw of claim 12, wherein the first scale has a zero marking positioned such that the first pointer indicates the zero marking when the rip fence is adjacent the blade and a last marking positioned such that the first pointer indicates the last marking when the rip fence is in the predetermined extended position relative to the auxiliary table.

16. The table saw of claim 15, wherein the second scale has an initial auxiliary marking positioned such that the second pointer indicates the initial auxiliary marking when the auxiliary table is in the non-extended position.

17. The table saw of claim 16, wherein the second scale has a final auxiliary marking positioned such that the second pointer indicates the final auxiliary marking when the auxiliary table is in the extended position.

18. The table saw of claim 17, wherein increments of the first scale increase from the zero marking to the last marking along a first direction, and wherein increments of the second scale increase from the initial auxiliary marking to the final auxiliary marking increase along a second direction opposite to the first direction.

19. The table saw of claim 12, further comprising a stop operable to stop movement of the rip fence relative to the auxiliary table at the predetermined position as the rip fence is moved away from the blade.

20. The table saw according to claim 12 further comprising a locking system to lock the auxiliary table in a selected position relative to the stationary table.

21. The table saw according to claim 12 wherein the fence includes a locking mechanism to secure fence in a position relative to the auxiliary table.

* * * * *